United States Patent
Sköld et al.

[11] Patent Number: 5,121,965
[45] Date of Patent: Jun. 16, 1992

[54] CHILD'S CAR SEAT

[75] Inventors: Björn-Ake Sköld, Norrkoöping; Claes Tingvall, Tyresö both of Sweden

[73] Assignee: AB Akta Barnsakerhet, Solna, Sweden

[21] Appl. No.: 348,580

[22] PCT Filed: Aug. 22, 1988

[86] PCT No.: PCT/SE88/00429
§ 371 Date: Jun. 15, 1989
§ 102(e) Date: Jun. 15, 1989

[87] PCT Pub. No.: WO89/01882
PCT Pub. Date: Mar. 9, 1989

[30] Foreign Application Priority Data
Aug. 27, 1987 [SE] Sweden ................ 8703323

[51] Int. Cl.⁵ ............. A47D 1/10; B60N 1/12
[52] U.S. Cl. ..................... 297/250; 297/283
[58] Field of Search ........ 297/378, 352, 250, 464, 297/216, 283, 284

[56] References Cited

U.S. PATENT DOCUMENTS

| | | |
|---|---|---|
| 2,947,350 | 8/1960 | Davis . |
| 3,281,183 | 10/1966 | Manglos . |
| 3,934,934 | 1/1976 | Farrell, Jr. et al. ............ 297/254 |
| 4,521,052 | 6/1985 | Cone ......................... 297/150 X |
| 4,664,443 | 5/1987 | Casale ........................ 297/238 |

FOREIGN PATENT DOCUMENTS

| | | |
|---|---|---|
| 1364052 | 5/1964 | France ........................ 297/378 |
| 8603333 | 2/1988 | Sweden . |

OTHER PUBLICATIONS

International Publication, WO0000988; Apr. 1981; Ettridge.

Primary Examiner—Peter R. Brown
Attorney, Agent, or Firm—Cushman, Darby Cushman

[57] ABSTRACT

A child's car seat which can be redisposed to function as a backwardly or forwardly facing child's car seat, a forwardly facing belt seat or a belt cushion. The child's car seat includes at least two slabs or cushion members, which form, in a collapsed state, a raised cushion, and of which a first one forms a sitting cushion and a second forms a back support in a swung out position.

8 Claims, 3 Drawing Sheets

CHILD'S CAR SEAT

BACKGROUND OF THE INVENTION

The present invention relates to a child's car seat, which can easily be adapted to different usages and to different ages of the user.

For properly protecting children during a journey, families travelling with children in a car must use a plurality of different protective products for the children, depending on their ages.

A number of protective devices for children travelling in a car are known in the patent literature and in practice. These devices can be divided substantially into the following four categories:

A. Backwardly facing seats. These are placed facing backwards so that the back of the child is facing the travelling direction, thus ensuring that, should there be a collision, the back of the seat will protect the child's head, back and pelvic region. These seats are generally used from the birth of the child and until the child is about three years old.

B. Forwardly facing seats with their own harnesses. These put the child in the travelling direction, and arrest it if a collision occurs, using the harness fitted to the seat. These seats are generally used from when the child is about 9 months until it is about 6 years old.

C. Forwardly facing belt seats. These seats also place the child in the travelling direction, and are arranged to suit the car belt to the child's body by lifting it up and/or by guiding the belt down away from the child's throat to its chest. This type of seat is also provided with a back.

D. Safety belt cushions. These cushions also put the child in the travelling direction. The cushion adapts the car belt to the child's body by lifting up the child. This cushion has no back.

SUMMARY OF THE INVENTION

The object of the present invention is to achieve an improved child's car seat, which can be easily changed in shape and function. It will thus be possible to use the seat for children of all ages, who need special protection during car travel, i.e. children from the time when they are born and up to when their hip joints have been developed, when they are about ten years old.

BRIEF DESCRIPTION OF THE DRAWINGS

The invention will now be described in more detail with the aid of an embodiment, not to be taken as restricting it, and with reference to the drawing, wherein.

DETAILED DESCRIPTION

Figure 1:
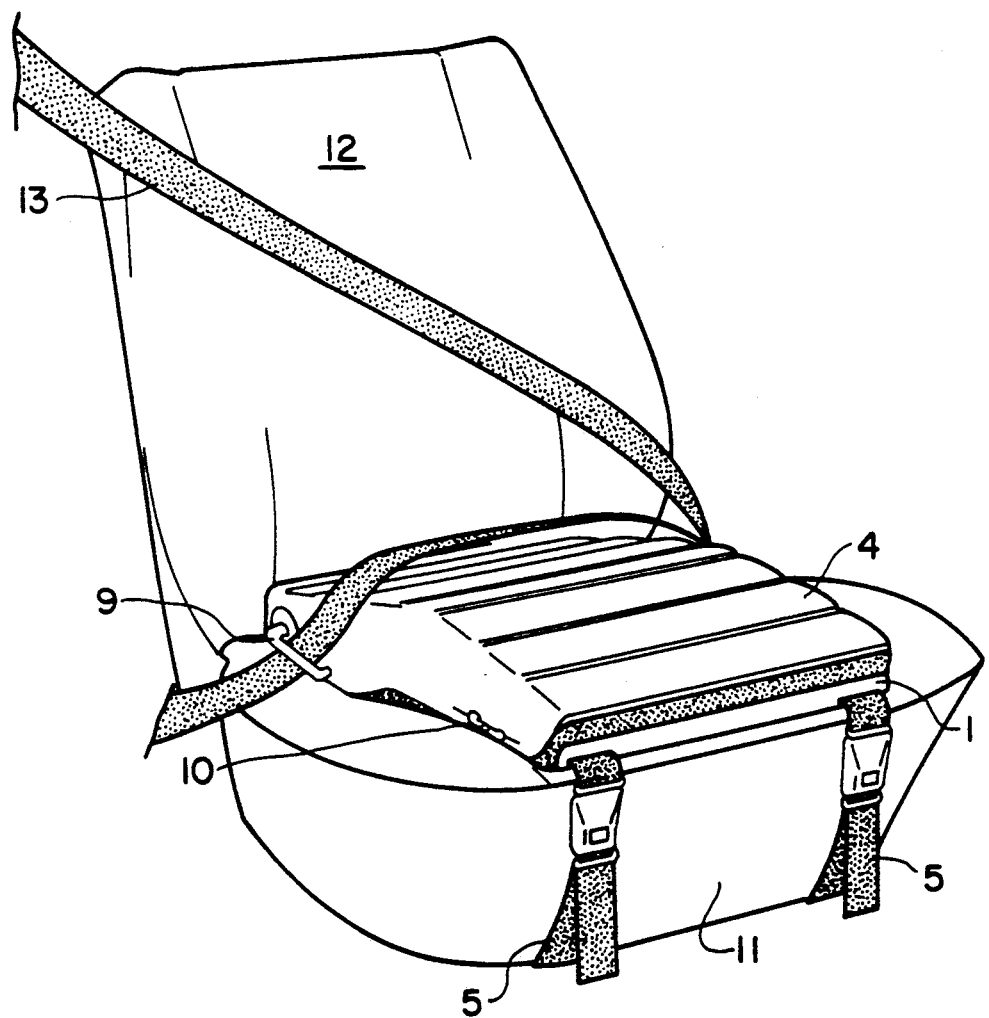
FIG. 1 illustrates a child's car seat embodying principles of the present invention, used as a belt cushion on a car seat.

In FIG. 1, the child's seat embodying principles of the present invention is illustrated fastened to a car seat 11, and used, in this instance as a belt cushion. The child's seat includes a lower slab or cushion member 1, fastened to the car seat 11 with fastening straps 5. The child's seat also includes a second slab or cushion member 4, providing a raised sitting surface for a child. The second slab 4 is hingedly joined to the first slab 1, and is provided on the portion of it near to brackrest 12 of the car seat 11 with guide means 9 for the lap portion of the car seat belt 13. In this instance, the child's car seat functions as an ordinary belt cushion, in the above-described category D.

Figure 2:
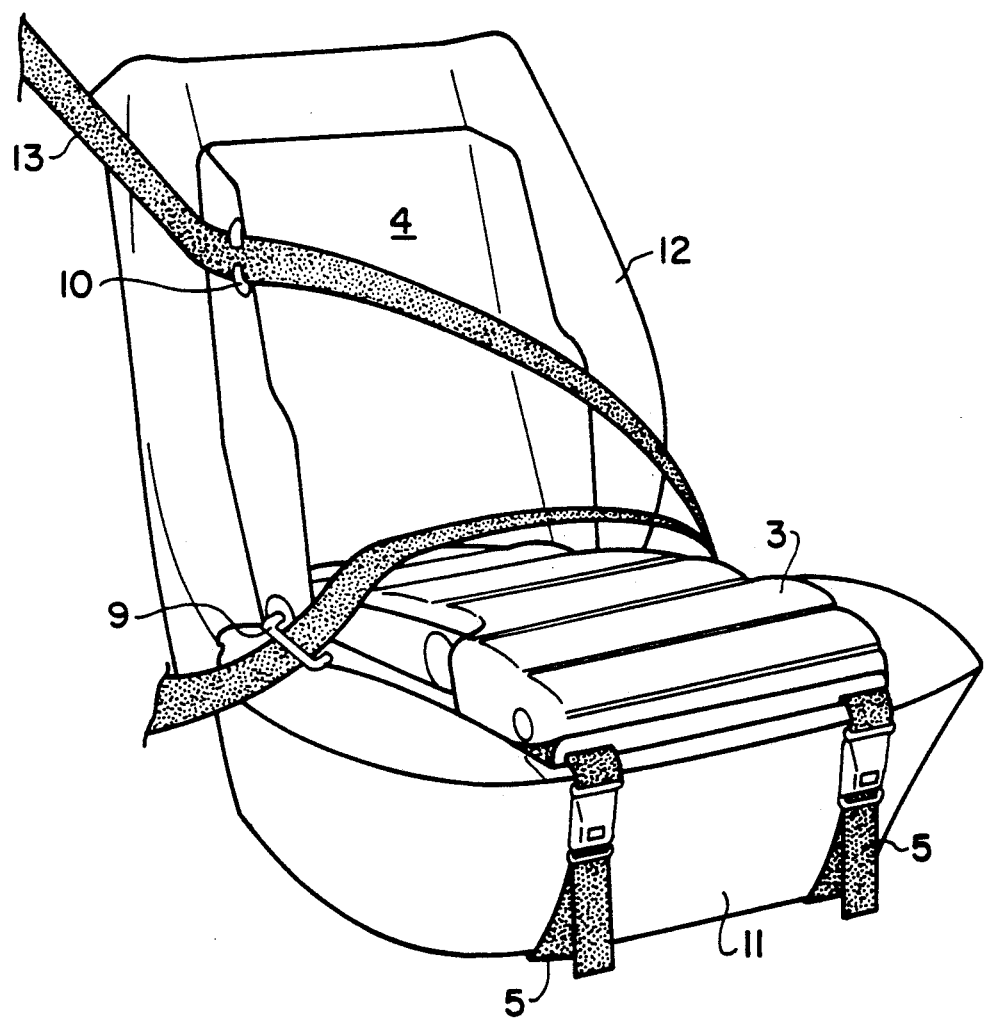
FIG. 2 illustrates the inventive child's car seat used as a forwardly facing belt seat fastened to a car seat.

In FIG. 2 the child's seat is used as a forwardly facing belt seat, as already mentioned. Similar to the previous instance, the first, lower slab 1 of this seat is fastened by straps 5 to the car seat 11. However, in this case the second slab 4 is folded up against the back 12 of the car seat to form a back for the child's seat. It will be seen from FIG. 2 that the second slab 4 is provided with side portions serving as side supports for the child sitting on the seat. As before, the car belt guide means 9 guide the lap portion of the car seat belt 13, while an upper guide means 10, attached to the free edge portion of the side portion of the second slab 4 serves as guide for the diagonal portion of the car belt 13. A third slab or cushion member 3 of the child's car seat serves as sitting cushion for the child, and gives the child a raised sitting position to suit the car belt 13. This usage accordingly corresponds to a child's car seat in the above-described category C.

Figure 3:
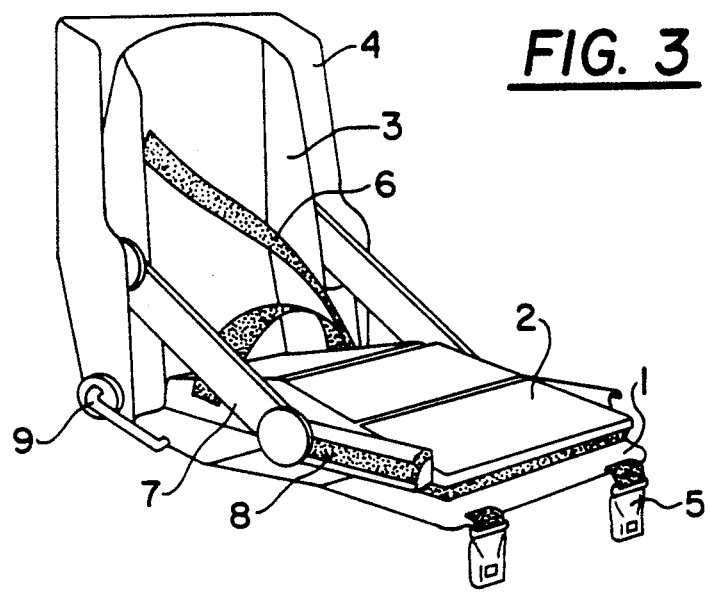
FIG. 3 illustrates the seat used as a forwardly facing car seat with its own harness.

FIG. 3, the child's seat is illustrated facing forwards and with its own safety belt in accordance with the seats in the above-mentioned category B. This seat is not depicted as being fastened to a car seat, but it is intended to fastened in a way corresponding to that in FIGS. 1 and 2, i.e. the lower slab 1 is fastened by straps 5 to a car seat. The second slab 4 is also swung out in this instance, but does not form the actual back here, the function of the back support being accomplished by the third slab 3, which is here swung out from the first slab 1 to form a back support. The third slab is also provided on its inside with its own safety belt 6 for restraining a child in the child's car seat. In this instance, the child is thus not restrained by the ordinary car safety belt. As with the second slab 4, the third slab 3 is suitably hingedly attached to the first slab 1. In this instance, the child sits on a cushion 2 attached to the first slab 1. The third slab 3, here the back support, is provided with support links 7, the lower ends of which can move in grooves 8 in members attached to the cushion 2. There is thus formed not only support for the back support, but also side support for the child sitting on the child's seat. The members with their grooves 8 also function as guides and retainers for the third slab 3 when it has been swung towards the slab 1.

Figure 4:
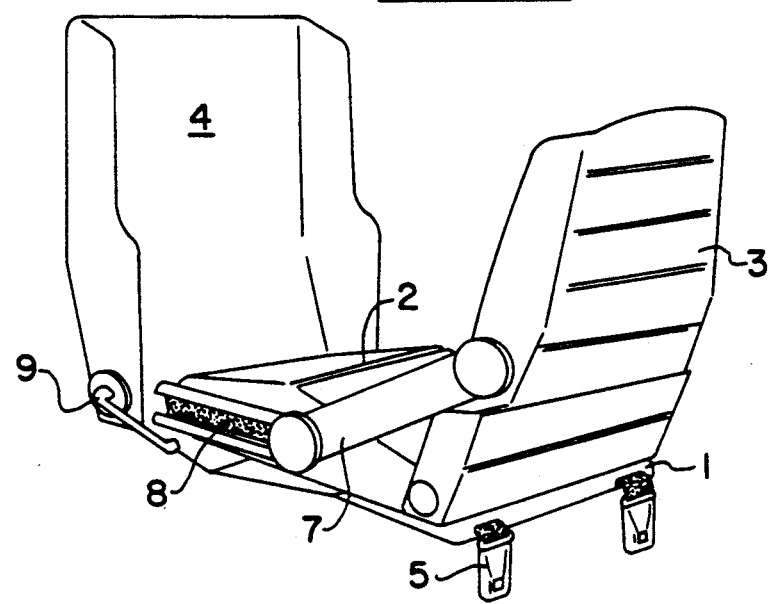
FIG. 4 illustrates the inventive seat used as a backwardly facing seat.

FIG. 4 the child's seat is used as a backwardly facing seat in the above-mentioned category A. The seat is formed here in exactly the same way as in FIG. 3, but with the third slab 3, i.e. the back support, facing away from the second slab 4. This can be achieved in different ways, e.g. by the cushion 2 and slab 3 being rotatably mounted on the first slab 1, so that they can be turned in the opposite direction to the depicted in FIG. 3. By swinging down the third slab 3 from the position illustrated in FIG. 4, and then turning the cushion 2 and third slab 3 180° in relation to the first slab 1, and subsequently swinging down the second slab 4, the child's car seat can be transformed from the backwardly facing seat illustrated in FIG. 4 to the belt cushion of FIG. 1.

By implementing the child's seat in accordance with the invention, there has thus been provided an easily collapsible seat which can be redisposed such as to function in all four of the categories mentioned hereinbefore. In this way, there can be obtained a portable device, for example, which can be easily stowed away, or can be transported as travelling luggage and be easily set up for the appropriate age and use.

In another variation of the invention, which has not been illustrated in the drawing figures, the child's car seat can form an integrated part of the ordinary back support in a car, in either the front or back seats, such as to be openable to meet the desired usage functions. In such an instance the second slab 4 constitutes the fixed part in the ordinary back support of the car seat. Alternatively, the child's seat can be formed as an integral part of the sitting portion of a car seat, the first slab 1 then constituting the fixed part in the sitting portion of the car seat, such that the other parts of the child's seat can be swung up from it.

In a further variation, the second slab 4 can be excluded, in which case the usage according to FIG. 2 will be eliminated. The child's car seat can then be used as a belt cushion, a forwardly facing child's seat or a backwardly facing child's seat. The slabs 1, 2, 3 and 5 preferably have the contours which are depicted in the drawings, and may be thought of as being panels.

We claim:

1. A child's car seat, comprising:
    a first panel and a second panel, each being generally rectangular, having four edges;
    the first and second panels having corresponding one edges of each arranged to be adjacent to one another;
    the first and second panels being hinged by first hinge means relative to one another for relative rotation generally about said one edges thereof, between:
        a first position, wherein said first and second panels are generally horizontal with said second panel overlying said first panel and thereby providing an elevated seating surface for a child, and
        a second position, wherein said first panel is generally horizontal and said second panel extends generally vertically;
    a third generally rectangular panel, having four edges;
    the third and one of the first and second panels having corresponding one edges of each arranged to be adjacent one another;
    the third and respective one of said first and second panels being hinged by second hinge means relative to one another for relative rotation generally about said one edges thereof, between:
        a first position, wherein said third panel is generally horizontal and sandwiched between said first and second panels to provide a seating surface for a child, and
        a second position, wherein said third panel extends generally vertically.

2. The child's car seat of claim 1, wherein:
    said first and second hinge means are adjacent one another, so that, in said second positions of said second and third panels, said third panel is ranked closely in front of said second panel.

3. The child's car seat of claim 1, wherein:
    said first and second hinge means are adjacent opposite edges of said first panel, so that in said second positions of said second and third panels, said third panel is spaced from said second panel by a major portion of said first panel, in order to provide said child's seat with one vertical panel for engaging a backrest of a forwardly facing car seat, and another vertical panel for providing a rearwardly facing seated child with a backrest.

4. The child's car seat of claim 1, further including:
    guide means on said second panel, distally of said first hinge means, for association with a shoulder belt of an automotive seat belt for guidingly securing a shoulder belt to the child's car seat when the second panel is disposed in said second position thereof relative to said first panel.

5. The child's car seat of claim 1, further including:
    guide means near said first hinge means for association with a lap belt of an automotive seat belt for guidingly securing a lap belt to the child's car seat when the second panel is disposed in said second position thereof relative to said first panel.

6. The child's car seat of claim 1, further including:
    means for securing said first panel to an automotive seat.

7. The child's car seat of claim 6, further including:
    guide means on said second panel, distally of said first hinge means, for association with a shoulder belt of an automotive seat belt for guidingly securing a shoulder belt to the child's car seat when the second panel is disposed in said second position thereof relative to said first panel.

8. The child's car seat of claim 7, further including:
    guide means near said first hinge means for association with a lap belt of an automotive seat belt for guidingly securing a lap belt to the child's car seat when the second panel is disposed in said second position thereof relative to said first panel.

* * * * *